2,837,570

METHOD OF PREPARING CARVONE

Seymour M. Linder, Eggertsville, and Frank P. Greenspan, Buffalo, N. Y., assignors to Food Machinery and Chemical Corporation, San Jose, Calif.

No Drawing. Application March 21, 1956
Serial No. 572,789

6 Claims. (Cl. 260—587)

This invention relates to a method for preparing l-carvone, and particularly to a method for preparing l-carvone from d-limonene and certain d-limonene derivatives.

l-Carvone, the levoratory form of carvone, by reason of its minty odor and flavor has found wide acceptance in the prepartion of cosmetics and comestibles. Typically, it is used as a flavoring and perfuming ingredient for toothpaste, mouth wash, chewing gum and mint candies. l-Carvone is expensive, presently being obtained from principally from spearmint oil in which it occurs naturally.

The high cost combined with the usefulness of l-carvone offers a strong incentive to chemists to devise synthetic methods for preparing the material. l-Carvone has been prepared from dextrorotatory limonene, i. e., d-limonene, which is readily obtainable as orange oil, by converting the d-limonene into the nitrosochloride derivative of that compound and subsequently dehydrochlorinating this derivative and hydrolyzing the product of dehydrochlorination to l-carvone. This process, while useful, requires the use of nitrosyl chloride and liquid sulfur dioxide and for this reason is difficult to carry out, and further requires the use of expensive apparatus capable of operating at sub-zero temperatures. This involved synthesis has been used, however, for the reason that while many attempts have been made to devise simpler and less hazardous methods for preparing l-carvone from readily obtainable d-limonene, these attempts generally have been unsuccessful. Such failures are not surprising when they are considered in the light of the well known unpredictability of the reactions of terpene chemicals, in which class d-limonene falls.

It is a feature of this invention to provide a method for preparing l-carvone synthetically and from readily available raw materials.

It is a further feature to provide a method for preparing l-carvone synthetically and with a minimum of complicated apparatus.

In accordance with the method of this invention, d-limonene glycol is oxidized with a selective oxidizing agent, suitably chromic acid, chromium trioxide, or a lower tertiary alkyl chromate, preferably tertiary butyl or tertiary amyl chromate, to effect conversion of the limonene glycol to the ketol derivative of d-limonene glycol, 1-hydroxyhydrocarvone. This ketol then is dehydrated to form l-carvone. The dehydration advantageously is effected by reacting the ketol with a carbonyl reagent which replaces the oxygen of the ketol carbonyl group with a radical the nature of which depends on the reagent used, and subsequently dehydrating and hydrolyzing the substitution product resulting from this reaction. In the dehydration and hydrolysis of the substitution product the carbonyl reagent radical is replaced with oxygen with the result that the carbonyl group is reformed, and further the ring unsaturation of l-carvone is produced. The structural formulae of the starting and intermediate compounds in the present synthesis of l-carvone from d-limonene glycol are represented as follows, along with the structural formulae of l-carvone, d-limonene and d-limonene monoxide. For purposes of illustration, the intermediate substitution product formed in the dehydration and hydrolysis of the 1-hydroxyhydrocarvone is represented as the semicarbazone derivative of that compound.

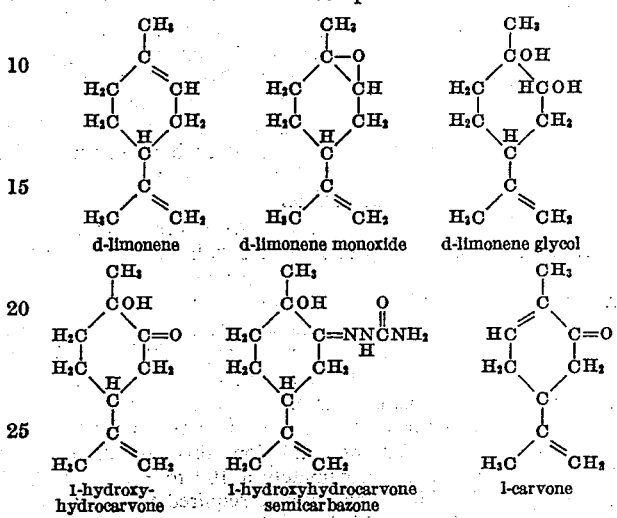

The d-limonene glycol employed herein preferably is derived from d-limonene, which is obtained from orange oil. d-Limonene is treated with an epoxidizing agent to form d-limonene monoxide, and this compound is hydrolyzed to form d-limonene glycol. Typical epoxidizing agents useful in the preparation of d-limonene oxide include the organic saturated aliphatic peracids, the aromatic peracids, and the inorganic peracids. These peracids may be formed by well known techniques.

The epoxidation preferably is carried out by reacting together in a suitable solvent medium, approximately equal molar quantities of an organic peracid and the d-limonene. When peracetic acid is employed, the reaction is conducted with stirring, generally at a temperature below 30° C. over a period of approximately one-half to one hour. Specific reaction conditions and solvent media will vary with the particular peracid used. For example, in some instances it will be found necessary to cool the reaction batch while in others it may be necessary to provide heat from an external source. The d-limonene monoxide which results from the epoxidation is separated from the reaction batch suitably by fractional distillation as the ingredient removed in the boiling range 74–75.5° at 9.5 mm. of mercury.

Hydrolysis of the d-limonene monoxide to d-limonene glycol advantageously is effected with a dilute acid solution, for example 1% aqueous sulfuric acid solution, at a temperature of from 0° C. to room temperature over a period of approximately 24 hours. Use of higher temperatures results in a reduction in the yield due to by-product formation, while at lower temperatures the mixture freezes and substantially no reaction occurs. As the reaction time is decreased, the yield decreases.

The d-limonene glycol is separated from impurities, for example by drying followed by fractional distillation, being removed as the fraction boiling at 140°–143° C./10 mm. Hg.

Examples of alternate methods for preparing the limonene glycol include the hydroxylation of d-limonene in acid medium with a suitable peracid, the reaction of d-limonene with hydrogen peroxide in the presence of tungsten oxide, and the auto-oxidation of d-limonene.

Oxidation of d-limonene glycol to the ketol, 1-hydroxyhydrocarvone involves selective oxidation of the secondary hydroxyl group of the d-limonene glycol to a carbonyl group, that is, oxidation of the secondary hydroxyl group without attack on the tertiary hydroxyl group or on the exocyclic double bond. This selective oxidation is accomplished by reacting the d-limonene glycol with a hexavalent chromium compound from the group of chromic acid, its anhydride chromium trioxide, or a lower tertiary alkyl chromate, preferably tertiary butyl chromate or tertiary amyl chromate. Reaction of the d-limonene glycol with one of these oxidizing agents results in the formation of oxidation products complexed with the chromium. These products are worked up to liberate the desired d-limonene glycol from these complex products in a form suitable for subsequent reaction, by treatment with suitable alkaline or acid reagents. Examples of such reagents useful herein are sodium carbonate, or a mixture of a dilute acid such as sulfuric acid with a reducing agent of the type of oxalic acid, tartaric acid, or hydrazine sulfate.

The tertiary butyl and amyl chromates are formable by reaction of the appropriate alcohol with chromic acid or chromium trioxide, normally in an inert organic solvent medium, e. g., benzene or toluene. For purposes of efficient operation in the oxidation process, the solution of the chromate ester as it is formed frequently is added directly to a solution of the d-limonene glycol in an inert organic solvent such as is referred to above. Preferably, 1.3 to 2.0 moles of chromate ester per mole of d-limonene glycol is employed for the oxidation, this amount of chromate ester being approximately a 100 to 300% excess over the stoichiometric amount required to oxidize the d-limonene glycol. This is for the reason that a portion of the chromate ester is converted to complexes, and in this form does not serve to oxidize the glycol. The excess is added to compensate for this. Following addition of the ester, the mixture is permitted to stand at room temperature for approximately 48 hours, during which time the product, 1-hydroxyhydrocarvone, precipitates out in a red solid. It is preferred to conduct the reaction in the neighborhood of 25° C., although the temperature can be raised above that point. It is advisable not to exceed 65° C., as there are indications in the literature that alkyl chromates can be decomposed violently above this temperature.

The red precipitate which is formed as noted above, is then worked up to provide the desired 1-hydroxyhydrocarvone. This is accomplished advantageously by addition to the precipitate of a mixture of dilute sulfuric and oxalic acids, followed by separation of the ketol, 1-hydroxyhydrocarvone, from the mixture. The ketol is an oil, and normally is produced in approximately 50% yield from the d-linonene glycol.

The chromic acid or chromium trioxide oxidation is carried out by adding substantially the equivalent amount of the oxidizing agent in water to a solution of d-limonene glycol in an inert organic solvent. On a stoichiometric basis, this amount of oxidizing agent is substantially 0.67 moles per mole of d-limonene glycol. Reaction in this case is rapid, and results in the formation of a dark brown solid. Some heat is liberated by the reaction, and preferably although not necessarily the reaction batch is cooled to maintain its temperature during reaction in the neighborhood of 25° to 30° C. The brown solid then is worked up to provide the ketol, 1-hydroxyhydrocarvone. This is accomplished readily by heating the solid in an aqueous solution of sodium carbonate for a short time, e. g., one hour at 80° to 90° C., and separating the oil, 1-hydroxyhydrocarvone, from the solution which is formed.

The ketol, 1-hydroxyhydrocarvone, then is dehydrated to form l-carvone. To this end, the ketol is reacted with a carbonyl reagent whereby the oxygen atom of the ketol carbonyl group is replaced, and subsequently the substitution product derived from this reaction is dehydrated and hydrolyzed to form l-carvone. The technique of replacing the carbonyl oxygen is carried out for the reason that direct dehydration of the ketol has proved to be ineffective. This is due perhaps to the presence in the ketol of hydrogen bonding between the ketol hydroxyl and carbonyl groups, and the hindering effect of such hydrogen bonding on the dehydration. The carbonyl reagent substitution product is believed to function herein by eliminating this hydrogen bonding.

Carbonyl reagents are a recognized class of materials which are used in organic analysis as agents for isolating and identifying aldehydes and ketones. They may be described generally as derivatives of ammonia containing free primary amino nitrogen. Specifically, free amine-containing compounds in the class of hydroxylamine, substituted hydroxylamines, hydrazine and the various substituted hydrazines such as the phenylhydrazines, semicarbazide and its derivatives such as semi-carbazide hydrochloride, and the thio derivatives of these compounds, are among known carbonyl reagents and are suitable for use herein. These reagents are believed to function by a condensation between the carbonyl oxygen and the amine hydrogen to form water and an unsaturated nitrogen-containing derivative of the aldehyde or ketone.

Reaction conditions for the reaction between the ketol and the carbonyl reagent are dependent on the particular reagent employed. Generally, the carbonyl reagent and the ketol are mixed in the presence of a suitable solvent, e. g., ethanol, and a small amount of acid such as hydrochloric acid is added to the solution. In some instances heat or cooling is required to effect a smooth reaction.

The derivative of the ketol contained in this reaction mixture is dehydrated and hydrolyzed, whereby the l-carvone unsaturation is produced and the carbonyl reagent radical is replaced with oxygen. As an efficient method for accomplishing this, the reaction mixture is acidified to a low pH, in the neighborhood of 1, and is steam distilled. During the steam distillation the pH is maintained at its low pH by addition of acid. The product of dehydration and hydrolysis, identifiable by methods stated hereinafter as l-carvone, then is extracted from the distillate resulting from the steam distillation, following which the extract, l-carvone, is purified.

The product resulting from this series of reactions is readily identified as l-carvone. It is an oil having the characteristic l-carvone odor of spearmint, and its carbonyl oxygen content is found by the method of Bryant and Smith, J. A. C. S., 57, 57 (1935) to agree closely with the calculated carbonyl oxygen value of 10.7%, for l-carvone. Furthermore, its degree of unsaturation, stated as its bromine number and determined by the method described in Scott and Fuhrman, Standard Methods of Chemical Analysis, 5th edition, Van Nostrand Co., Inc., New York, 1944, vol. 2, p. 1770, agrees closely with the calculated bromine number, 211, of l-carvone.

The following example which describes the synthesis of l-carvone from d-limonene is given by way of illustration only and is not to be considered as a limitation on ingredients, amounts thereof, or reaction conditions useful in the process of the present invention.

EXAMPLE

*Epoxidation of d-limonene*

500 grams of d-limonene was dissolved in 2250 ml. of chloroform. 7.5 grams of anhydrous sodium acetate dissolved in 520 grams of a 40% solution of peracetic acid was added slowly with stirring to the d-limonene solution. An exothermic reaction occurred, and the temperature of the above reaction mixture was maintained at between 25° and 30° C. by cooling in a Dry Ice-acetone bath. The reaction mixture was stirred for 15 minutes following introduction of all the sodium acetate-peracetic acid solution. Following this the water layer was separated from the chloroform layer and the latter was washed with water, sodium bicarbonate solution, and again with water, and was dried over anhydrous magnesium sulfate to separate and purify the d-limonene monoxide resulting from the above reaction. The product of reaction was a liquid which boiled at 74° to 75.5° C./9.5 mm. and upon analysis showed 10% oxirane oxygen and a bromine number of 110.

Hydrolysis of d-limonene monoxide 100 grams of d-limonene monoxide was added slowly with stirring to 200 grams of a 1% sulfuric acid solution maintained with an ice bath at a temperature between 0° and 2° C. and the reaction mixture was stirred for 24 hours. A solid precipitated gradually from the reaction mixture. This solid was filtered from the reaction mixture, washed free of residual acid with water, dissolved in ether and dried. The solid product then was fractionally distilled, being taken off as the fraction boiling at from 140° to 143° C./10 mm. of Hg, the boiling point of d-limonene glycol. The product was identified further by examination of its solubility characteristics, and was found to be slightly soluble in water, benzene, and chloroform, and moderately soluble in ether and toluene. The solubility characteristics agreed with the solubility characteristics of d-limonene glycol, and this product was identified further as d-limonene glycol by its melting point of 70°–73° C., its glycol content of 10%, and its bromine number of 105.

Selective oxidation of d-limonene glycol 17 grams of anhydrous d-limonene glycol in 150 ml. of benzene was added with stirring, over a 15-minute period to a solution in 50 ml. of benzene and 15 ml. of tertiary butyl alcohol, of 30 g. of tertiary butyl chromate. During and following addition of the d-limonene glycol, the temperature of the batch was maintained at 20°–25° C. by means of a cooling water bath. Following addition of all the limonene glycol, the solution was permitted to stand without agitation for 48 hours, during which time a red solid gradually precipitated. 25 grams of hydrated oxalic acid in 200 ml. of 10% sulfuric acid was added to the reaction batch rapidly and with stirring, and the temperature was permitted to reach its own level, at 46° C. The batch was permitted to stand for four hours, following which the aqueous liquid phase was extracted with ether and the ether extract was dried over anhydrous magnesium sulfate. The dried ether solution resulting was heated to remove the ether by evaporation, and 7.5 grams of oil was produced. This oil was shown to be a relatively pure compound containing the carbonyl and hydroxyl groups of 1-hydroxyhydrocarvone. Thus the carbonyl content was shown to be 85% of theory and the hydroxy content 80% of theory.

Dehydration of 1-hydroxyhydrocarvone

The 7.5 grams of oil was dissolved in 7.5 ml. of ethanol, and to this solution was added a solution in 20 ml. of water of 5 grams of semicarbazide hydrochloride and 3.7 grams of sodium acetate. Following this addition an oil separated from the solution. 25% sulfuric acid was added to the above mixture containing the oil and the alcohol-water phase, to lower its pH to from 0.9 to 1.0. The mixture then was steam distilled, the distillate was extracted with ether, and the ether extract was washed consecutively with water, sodium bicarbonate and water, and was dried. The dried material then was heated to evaporate the ether from the solution, leaving 4.5 grams of an oil having the odor of spearmint.

3 grams of this oil was purified by converting it to the sodium sulfite derivative, then regenerated by making the sodium sulfite solution alkaline. Thus, 1 gram of oil having the odor of spearmint was obtained.

This product was analyzed for carbonyl content and for bromine number according to the heretofore cited methods and was found to contain 10.3% of carbonyl oxygen and to have a bromine number of 210.8, which correspond to theoretical values of 10.7 and 211, respectively. Furthermore, the product formed a hydrogen sulfide derivative, as is characteristic of l-carvone. These determinations, along with its physical appearance and its characteristic spearmint odor, indicated that the product was l-carvone.

Having described our invention, what we claim as new and desire to secure by Letters Patent of the United States is:

1. Method of preparing l-carvone comprising reacting upon d-limonene glycol with a selective oxidizing agent to produce 1-hydroxyhydrocarvone, reacting upon said 1-hydroxyhydrocarvone with a carbonyl reagent to produce a substitution product of said 1-hydroxyhydrocarvone and dehydrating and hydrolyzing said substitution product to provide l-carvone.

2. Method of preparing l-carvone comprising reacting upon d-limonene glycol with a selective oxidizing agent from the group consisting of chromic acid, chromium trioxide, and the lower tertiary alkyl chromates to produce 1-hydroxyhydrocarvone, reacting upon said 1-hydroxyhydrocarvone with a carbonyl reagent to produce a substitution product of said 1-hydroxyhydrocarvone and dehydrating and hydrolyzing said substitution product to provide l-carvone.

3. Method of preparing l-carvone comprising reacting upon d-limonene glycol with chromic acid to produce 1-hydroxyhydrocarvone, reacting upon said 1-hydroxyhydrocarvone with a carbonyl reagent to produce a substitution product of said 1-hydroxyhydrocarvone and dehydrating and hydrolyzing said substitution product to provide l-carvone.

4. Method of preparing l-carvone comprising reacting upon d-limonene glycol with chromium trioxide to produce 1-hydroxyhydrocarvone, reacting upon said 1-hydroxyhydrocarvone with a carbonyl reagent to produce a substitution product of said 1-hydroxyhydrocarvone and dehydrating and hydrolyzing said substitution product to provide l-carvone.

5. Method of preparing l-carvone comprising reacting upon d-limonene glycol with tertiary butyl chromate to produce 1-hydroxyhydrocarvone, reacting upon said 1-hydroxyhydrocarvone with a carbonyl reagent to produce a substitution product of said 1-hydroxyhydrocarvone and dehydrating and hydrolyzing said substitution product to provide l-carvone.

6. Method of preparing l-carvone comprising reacting upon d-limonene glycol with tertiary amyl chromate to produce 1-hydroxyhydrocarvone, reacting upon said 1-hydroxyhydrocarvone with a carbonyl reagent to produce a substitution product of said 1-hydroxyhydrocarvone and dehydrating and hydrolyzing said substitution product to provide l-carvone.

References Cited in the file of this patent

Simonsen, The Terpenes, vol. I, 2nd ed., pp. 154–155 (1947).

Bordenca et al., Ind. and Eng. Chem., vol. 43, pp. 1196–1198 (1951).